(12) United States Patent
Nunez

(10) Patent No.: US 12,223,791 B2
(45) Date of Patent: Feb. 11, 2025

(54) PREORDER PICKUP OF AN AUTONOMOUS VEHICLE

(71) Applicant: GM Cruise Holdings LLC, San Francisco, CA (US)

(72) Inventor: Juan Nunez, Palo Alto, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 178 days.

(21) Appl. No.: 18/092,435

(22) Filed: Jan. 2, 2023

(65) Prior Publication Data

US 2024/0221447 A1   Jul. 4, 2024

(51) Int. Cl.

| | |
|---|---|
| *G07C 9/38* | (2020.01) |
| *B60W 60/00* | (2020.01) |
| *G06Q 10/0832* | (2023.01) |
| *G06Q 10/0836* | (2023.01) |
| *G06Q 50/30* | (2012.01) |
| *G06Q 50/40* | (2024.01) |
| *G07C 9/00* | (2020.01) |
| *G07C 9/37* | (2020.01) |

(52) U.S. Cl.
CPC ........... *G07C 9/38* (2020.01); *B60W 60/0025* (2020.02); *G06Q 10/0832* (2013.01); *G06Q 10/0836* (2013.01); *G06Q 50/40* (2024.01); *G07C 9/00571* (2013.01); *G07C 9/00896* (2013.01); *G07C 9/37* (2020.01)

(58) Field of Classification Search
CPC ........ G07C 9/38; G07C 9/37; G07C 9/00571; G07C 9/00896; B60W 60/0025; G06Q 50/40; G06Q 10/0832; G06Q 10/0836
See application file for complete search history.

(56) References Cited

U.S. PATENT DOCUMENTS

| | | | |
|---|---|---|---|
| 10,106,206 B1* | 10/2018 | Baccouche | B62D 25/04 |
| 2018/0321679 A1* | 11/2018 | Nixon | G08G 1/202 |
| 2018/0340790 A1* | 11/2018 | Kislovskiy | G01C 21/3484 |
| 2018/0341888 A1* | 11/2018 | Kislovskiy | G08G 1/096838 |
| 2019/0031144 A1* | 1/2019 | Gat | B60R 25/25 |
| 2019/0041864 A1* | 2/2019 | Konishi | G06Q 10/0832 |
| 2019/0146508 A1* | 5/2019 | Dean | G05D 1/0285 |
| | | | 701/26 |
| 2020/0183414 A1* | 6/2020 | Shih | B60R 25/01 |
| 2020/0327460 A1* | 10/2020 | Suzuki | H04W 4/024 |
| 2020/0369298 A1* | 11/2020 | Jikumaru | G05D 1/0088 |
| 2021/0188034 A1* | 6/2021 | Meador | B60H 1/00014 |
| 2021/0256472 A1* | 8/2021 | Javidan | H04W 4/12 |
| 2022/0076517 A1* | 3/2022 | Haddad | G06Q 10/0837 |
| 2022/0101459 A1* | 3/2022 | Hwang | A47J 44/00 |

(Continued)

*Primary Examiner* — Chico A Foxx
(74) *Attorney, Agent, or Firm* — Dimitri Kirimis

(57) ABSTRACT

Systems and techniques are provided for providing a preorder delivery in an autonomous vehicle (AV). An example method includes receiving, from a computing device associated with a user, a first user request for a ride in an AV from a user location to a user destination; receiving, from the computing device associated with the user, a second user request for the AV to pick up a product at a pick up location associated with the product, prior to picking up the user; determining, based on the first and second user requests, a route for the AV to navigate; and sending, from a computer associated with the AV to a locker of the AV, an instruction to open the locker where the product is placed.

20 Claims, 6 Drawing Sheets

(56) References Cited

U.S. PATENT DOCUMENTS

| | | | | |
|---|---|---|---|---|
| 2022/0292573 A1* | 9/2022 | Ferguson | ................ | B65G 67/24 |
| 2023/0097471 A1* | 3/2023 | DeStasio | ................. | B60R 7/043 |
| | | | | 224/542 |
| 2024/0035830 A1* | 2/2024 | Gall | ..................... | G06Q 10/063 |
| 2024/0129295 A1* | 4/2024 | Cserna | .................... | H04W 4/40 |
| 2024/0187241 A1* | 6/2024 | Garcia | ................. | H04L 9/3231 |
| 2024/0256990 A1* | 8/2024 | Garcia | ................... | G06Q 10/02 |
| 2024/0394644 A1* | 11/2024 | Phelps | ................. | G06Q 10/083 |

* cited by examiner

PREORDER PICKUP OF AN AUTONOMOUS VEHICLE

TECHNICAL FIELD

The present disclosure generally relates to providing a preorder delivery in an autonomous vehicle. For example, aspects of the present disclosure relate to techniques and systems for providing preorder delivery in a secured locker of an autonomous vehicle before picking up a user.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

Illustrative examples and aspects of the present application are described in detail below with reference to the following figures.

DETAILED DESCRIPTION

Figure 1:
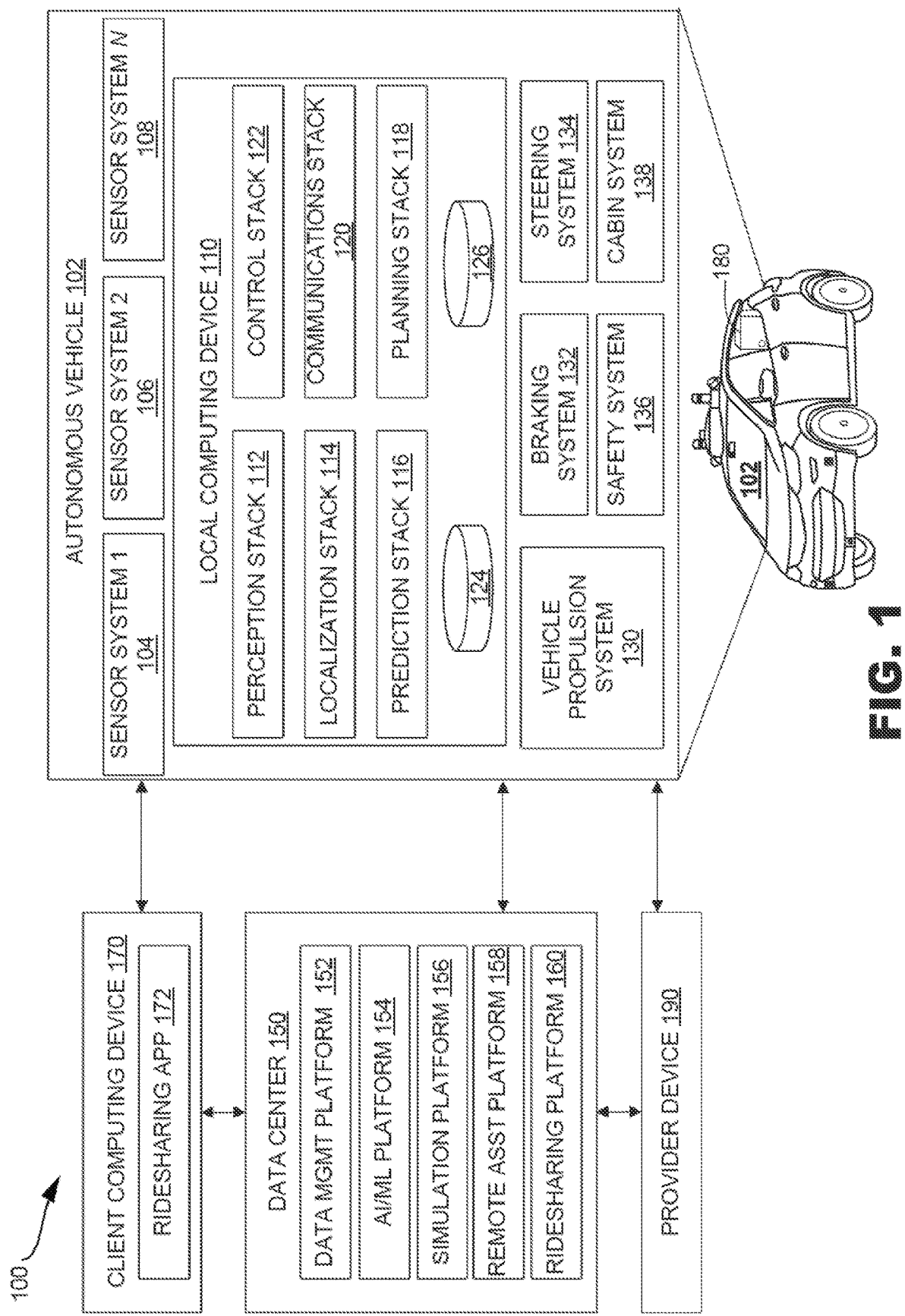
FIG. 1 is a diagram illustrating an example system environment that can be used to facilitate autonomous vehicle (AV) navigation and routing operations, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of the subject matter of the application. However, it will be apparent that various aspects and examples of the disclosure may be practiced without these specific details. The figures and description are not intended to be restrictive.

The ensuing description provides examples and aspects of the disclosure, and is not intended to limit the scope, applicability, or configuration of the disclosure. Rather, the ensuing description of the examples and aspects of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, an audio sensor, amongst others, which the AVs can use to collect data and measurements that the AVs can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

In some cases, an AV can provide a transportation service such as a ridesharing service that gives a ride from one place to another. To illustrate, a ridesharing platform of an AV can interact with a user (e.g., a customer of a ridesharing service), for example, by receiving requests for pick-ups and drop-offs via a ridesharing application executing on a user's computing device. In other words, a user can request a trip from a user location to a destination via a ridesharing application. A planning stack of an AV can plan a route or path for the AV to safely and efficiently complete the trip as requested by a user. For example, a user can schedule a trip from the user's house to a grocery store. If the user would like a cup of coffee on the way to the grocery store, the user can add a stop so that the AV can make a stop at a coffee shop on the way from the user's house to the grocery store. However, there may be some constraints (e.g., a time constraint) that hinder or prevent the user from making a stop between the user's initial location to the final destination. For example, if there is too much traffic on the way to the coffee shop the user may not have enough time to get ready on time for the trip, or the grocery store might be closed if the AV were to make a stop at the coffee shop.

Described herein are systems, apparatuses, processes (also referred to as methods), and computer-readable media (collectively referred to as "systems and techniques") for providing a preorder delivery in an AV. More specifically, the systems and techniques described herein can provide a preorder delivery in an AV before the AV picks up the user so that a product/goods can be made ready in the AV for the user by the time the AV picks up the user. In some examples, the systems and techniques described herein can plan an AV route that travels from a location of the AV to a pick-up location for requested products/goods, to a user location to pick up the user, and to a user destination to drop off the user.

To illustrate, the systems and techniques described herein can receive a request from a user device (e.g., a computing device) for a ride in an AV from a user location to a user destination. The user request can further include a request for the AV to make a stop at a waypoint to pick up a product/goods prior to picking up the user at the user location. In other words, the user request can include products/goods pick-up, a user pick-up, and a user drop-off in a sequential manner. Thus, conveniently, the AV can pick-up the product/goods requested by the user prior to picking up the user such that when the AV picks up the user, the AV has the products/goods available to the user.

In some cases, the systems and techniques described herein can plan a route/path for the AV to travel, based on the user request, from the initial location of the AV to the pick-up location for the requested products/goods, from the pick-up location for the requested product/goods to the user location, and finally from the user location to the user destination. The requested products/goods can be picked up first before the AV picks up the user. As follows, when the AV picks up the user, the user can get the requested products/goods without having to physically travel to the products/goods pick-up location.

In some aspects, the delivery of the requested products/goods can be made after an AV drops off a user at a user destination. In other words, the user request can include a request for the AV to drop off products/goods at a product destination after the AV drops off the user at the user destination. For example, when the AV picks up the user, the user can leave or store products/goods (e.g., outgoing mail, dirty laundry, book rentals, etc.) in the AV that needs to be dropped off at the products destination (e.g., post office, dry cleaner, library, etc.) so that the AV can travel to the products destination to drop off the product/goods without the user having to physically travel to the product/goods destination. In this case of dropping off a product/goods, the systems and techniques described herein can plan a route/path for the AV to travel from the initial location of the AV to the user location, to the user destination, and to the product/goods destination.

In some cases, the AV can determine a time to pickup a product/good before the user based on one or more factors such as, for example and without limitation, a desired temperature of the product/good relative to an ambient temperature when the product/good is delivered to the user when the user is picked-up; a distance between the AV, the location of the product/good (and, in some cases, various locations where the product/good can be obtained), and/or the location of the user; an estimated duration of a trip from the AV to one or more locations where the product/good can be obtained/picked-up and/or to the location of the user; an amount of traffic along a route(s) between the AV and one or more locations where the product/good can be obtained/picked-up and/or the location of the user; etc.

For example, if the user requests the AV to pick-up a product that is prepared at a certain temperature or range of temperatures above an ambient temperature (e.g., coffee, tea, food, etc.), the user may want that product to have a lower temperature when the product is delivered by the AV to the user (e.g., so the user does not have to wait for the product to cool down to a certain temperature that allows the user to consume the product without the risk of burns or discomfort), the AV can estimate an amount of time that it may take the AV to reach the user from the location of the product. Based on the estimated amount of time to reach the AV and an estimated and/or measured temperature of the product at the time it is picked-up by the AV, the AV can determine whether to lengthen or shorten the trip to the user (e.g., by changing routes to the user, avoiding areas with more or less traffic, etc.) to provide more or less time for the product to cool or reduce the amount of cooling during the trip from the location of the product to the user. To illustrate, if the product is a cup of coffee having a certain temperature or range of temperatures above an ambient temperature and the estimated time-of-arrival of the AV to the user when using a particular route is estimated to be less than a threshold duration such that the cup of coffee may be too hot to consume when the AV arrives at the user's location, the AV may determine to take a longer route or a route with more traffic to allow the cup of coffee to cool down further before it is delivered to the user.

Alternatively or additionally, the AV may determine to pick-up the cup of coffee earlier in time (e.g., relative to the time the AV is expected to arrive at the location of the user) to increase the amount of time from when the cup of coffee is picked up and the AV arrives at the location of the user. The AV may coordinate such timing with the timing of any other trips the AV may be scheduled to make. For example, the AV may have a trip with another user before it is scheduled to pick-up the user scheduled to receive the cup of coffee. Accordingly, the AV may pick-up the cup of coffee before picking up the other user to increase the amount of time between picking up the cup of coffee and delivering the cup of coffee to the user when picking up the user. This way, the coffee has more time to cool before it is delivered to the user.

In some examples, if the type of product/good selected by the user being picked-up by the AV is a type of product that can be obtained at any of multiple stores, the AV may select which store to pick-up the product/good from based on one or more factors such as, for example, a desired temperature and/or range of temperatures of the product/good at the time it is delivered to the user; a distance between the AV, the locations offering that product/good within a certain distance or geofence, and/or the location of the user; the cost of the product/good at the various locations offering that product/good within a certain distance and/or geofence; and/or any other factor. For example, if the request product is a cup of coffee, the AV may select a particular coffee shop within a distance and/or geofence based on the estimated duration of the AV's trip from that particular coffee shop to the location of the user (e.g., relative to, and/or in comparison with, the estimated duration of the AV's trip from other coffee shops to the location of the user). Thus, if the AV wants to increase the duration from the time the AV picks-up the cup of coffee to the location of the user (and thus decrease the temperature of the cup of coffee at the time it is delivered to the user), the AV may select a coffee shop that may extend the duration of the trip to the location of the user after picking up the cup of coffee (e.g., relative to the duration of the trip from other coffee shops to the location of the user). On the other hand, if the AV wants to decrease the duration from the time the AV picks-up the cup of coffee to the location of the user (and thus increase the temperature of the cup of coffee at the time it is delivered to the user), the AV may select a coffee shop that may reduce the duration of the trip to the location of the AV after picking up the cup of coffee (e.g., relative to the duration of the trip from other coffee shops to the location of the user). In some cases, after selecting a particular location from where to pick-up the product/good for the user, the AV may submit an order and/or request to that location for the desired product/good or may send a message to the user to submit the order and/or request to that location.

In some cases, the AV can leverage information collected by other AVs when attempting to time the arrival of the AV to the location of the desired product/good and the time of arrival of the AV to the location of the user. For example, if the AV intends to increase the duration of time from when it picks-up the desired product/good and the time when the AV arrives at the location of the user, the AV may receive sensor data from other AVs in a fleet of AVs that may provide relevant information such as, for example, traffic in different routes to a location of the product/good, traffic in different routes to different possible locations where the product/good may be picked-up, customer lines at relevant stores from where the product/good may be obtained, construction zones and/or road closures along one or more routes to a location of the product/good and/or to various locations where the product/good may be obtained, etc.

To illustrate, the AV may receive image data collected by camera sensors of one or more other AVs that depicts the length of the customer line at one or more registers of each of a plurality of location from where the AV may obtain a particular product for the user. If the AV intends to extend the duration of the trip from picking-up the product to delivering the product to the user (e.g., to provide more time for the product to cool to a lower temperature, to coordinate between multiple user trips, and/or any other reason), the AV may select the particular location with the longest customer line (and/or the slowest moving customer line). In some examples, the AV may use computer vision (e.g., object detection/image processing) to estimate the length of customer lines and/or the progress of customer lines from image data obtained from other AVs. Alternatively, if the AV intends to decrease the duration of the trip from picking-up the product to delivering the product to the user (e.g., to provide less time for the product to warm or cool, to coordinate between multiple user trips, and/or any other reason), the AV may select the particular location with the shortest customer line (and/or the slowest moving customer line).

In some cases, the AV can use one or more sensors to monitor a state of a product/good picked-up by the AV for delivery to a user that the AV is picking up. For example, if the AV picks-up a bag of ice (or any other product such as, for example, medicine, chemicals, a drink, etc.) for the user, the AV can analyze image data depicting the bag of ice obtained from one or more camera sensors of the AV during the trip to the user. If the AV determines that the bag of ice is melting at a faster than expected pace (e.g., by analyzing image data depicting the bag of ice), the AV may decrease the temperature of the AV and/or a locker containing the bag of ice, and/or may use route and/or traffic information to identify a different route that may reduce the time-of-arrival to the location of the user (e.g., because of less traffic, because of a shorter distance, because of faster and/or larger traffic lanes, because of a lower amount of stop signs and/or traffic lights, etc.). As another example, if the product picked-up by the AV is one that is sensitive to sunlight and can melt when exposed to sunlight and/or certain ambient temperatures, the AV can monitor the conditions of the product by analyzing image data depicting the product (e.g., as obtained via one or more camera sensors of the AV) to determine whether to adjust a temperature within a cabin of the AV and/or a locker containing the product, to prevent or reduce melting of such product. Alternatively or additionally, the AV may trigger a surface or object in the AV to move to a location that blocks sunlight that may reach the product during the trip to the location of the user.

In some cases, the AV may activate one or more temperature sensors to monitor a temperature of a temperature-sensitive product (e.g., food, coffee, tea, chemicals, medicine, etc.) and make adjustments to the temperature around the product (e.g., the temperature in the AV and/or in a locker containing the product), objects and/or surfaces that may block sunlight or allow sunlight to reach the product, increase or reduce the length of the trip from the location of the product to the location of the user, and/or any other adjustments as described herein. In some cases, to avoid contact by the one or more temperatures with the contents of the product (e.g., if the product includes food, medicine, a chemical, and/or a liquid/beverage), the AV may use one or more optical temperature sensors that can measure the temperature of the product based on light sent to that product and reflected from that product.

Moreover, an AV implementing the systems and techniques described herein can include a locker placed within the AV to transport products and/or goods in a safe and secure manner. To illustrate, the AV can include a secured locker, which is temperature controlled to allow the AV to transport (e.g., via the secured locker) products and/or goods that may need to be refrigerated (e.g., certain medications, frozen goods, dairy products, certain supplements, certain devices and/or equipment, etc.) or otherwise maintained within a certain temperature (or range of temperatures) including warmer temperatures or heat (e.g., warmer than the average temperature inside of the AV and/or in the environment surrounding the AV) or colder temperatures as previously explained). The product/goods requested by the user can be picked up by the AV and placed within the locker (e.g., by a person(s) providing the product/goods to the AV or by a robotic device such as an autonomous pick-up system configured to receive product/goods and transfer the product/goods from the autonomous pick-up system to the secured locker). The secured locker can be temperature controlled as previously explained, so that the product/goods can be kept at the desired temperature (e.g., to keep a cup of coffee warm, to prevent frozen items from melting, etc.). In some cases, the temperature of the locker can be controlled or selected by a user, an AV, and/or a person(s) providing the product/goods to the AV. In some examples, the temperature of the locker can be controlled or selected based on the product/goods being placed in the locker (e.g., product/goods that need to be maintained at a certain temperature as previously described). In some cases, the temperature of the locker can be controlled or selected to maintain the current temperature of the product/goods, for example, by determining the current temperature of the product/goods with a sensor(s) of the AV.

In some cases, based on the estimated time of travel/trip or path of the AV, a heating or cooling plan/cycle can be scheduled for the product/goods placed in the locker, for example, by the AV or the user. As follows, the product/goods can be delivered or arrive at a destination at the desired temperature while saving energy (e.g., electricity) for heating and/or cooling. For example, if the estimated time period of the trip is below a time threshold (e.g., 2 minutes), the heating and/or cooling can be scheduled for a smaller or reduced amount of time. In another example, if the estimated time period of the trip is above a time threshold (e.g., 20 minutes), the heating and/or cooling can be scheduled for a prolonged time period. In some cases, the scheduling of the heating/cooling cycle can be based on whether or how much the product/goods can withstand or is prone to temperature changes (e.g., coffee in an insulated tumbler or in a regular paper cup).

Further, the locker is operated with a locking system that only allows a designated set of users to have access or authorization to open the user-designated locker. The verification of the user who has the accessibility or authorization to the specific locker can be performed by the use of one or more sensor systems of the AV. For example, the sensor systems of the AV can provide sensor data (e.g., biometric data associated with the user). The systems and techniques described herein can verify the user, including the customer/rider or a supplier of the product, and send a signal to open the locker automatically upon verification of the user based on the sensor data such as facial recognition data, fingerprint recognition data, voice recognition data, iris scan data, and retinal recognition data.

In some cases, the AV may include a portable camera device that an agent at a location of a requested product/good may use to capture image data of various options available for the requested product/good. The agent at that location can use the portable camera device to send an image and/or a video feed to the user in order to allow the user to select between various options of a type of product/good and/or various customizations that can be made to the product/good. In some cases, the portable camera device can have network/communication capabilities to allow the user to communicate with the agent at the location. Once the user has made any selections based on the image and/or video feed received from the portable camera device, the agent at the location may return the portable camera device to the AV and may place the selected product/good in the AV for delivery to the user when picking up the user. In other examples, the agent may use the portable camera device to send to the user one or more images and/or a video feed depicting a product to allow the user to visually inspect the product and/or watch an inspection or test of the product prior to finalizing the purchase. For example, if the user requests a particular tool, the agent at the location may use the portable camera device to stream a demonstration of the tool being used so the user can verify that the tool is suitable for the intended purpose of the user.

Various examples of the systems and techniques described herein providing a preorder delivery in an autonomous vehicle are illustrated in FIG. 1 through FIG. 6 and described below.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate is that such variations do not depart from the scope of the present disclosure.

In this example, the AV management system 100 includes an AV 102, a data center 150, a client computing device 170, and a provider device 190. The AV 102, the data center 150, the client computing device 170, and the provider device 190 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, the client computing device 170, and/or the provider device 190, among other systems. The local computing device 110 can include one or more processors and memory, including instructions that can be executed by the one or more processors. The instructions can make up one or more software stacks or components responsible for controlling the AV 102; communicating with the data center 150, the client computing device 170, the provider device 190, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, the provider device 190, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, the provider device 190, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, the provider device 190, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The AV 102 can include a secured locker 180 that can store a product/goods. In some examples, the locker 180 is secured and can be unlocked by a locking system/mechanism that controls the opening and closing of the locker 180. In some examples, the locking system can be mechanical (e.g., actuated by means of a key) or electronic (e.g., activated by means of wireless signals). In some aspects, access to the locker 180 can be locally and/or remotely (e.g., wirelessly) programmable. In other words, the operation of the locking system can be controlled or programmed locally and/or remotely to grant closing and opening authorizations to a designated user with access. In some examples, the locker 180 can be coupled to a code reader, which is configured to read a code (e.g., a Quick Response (QR) code, a bar code, etc.) to determine granting closing and opening authorizations.

In some examples, the locker 180 is temperature controlled (e.g., thermally insulated). In some cases, the locker 180 can comprise a refrigerator, a freezer, a heater, or any applicable cooling or heating means (e.g., a fan, ice, dry ice, heat pack, etc.) to keep the interior of the locker 180 at the desired temperature. For example, a product/goods that needs to be kept at a certain range of temperature (e.g., hot beverages, perishables, frozen foods, etc.) can be maintained in the locker 180 at a proper temperature.

In some examples, sensor systems 104, 106, and 108 can be arranged about locker 180 (e.g., front or rear, top or bottom, interior or exterior, etc.) Non-limiting examples of the sensor systems can include a camera, a light sensor, a RADAR system, a weight sensor, a temperature sensor, and so forth. For example, a temperature sensor of the locker 180 can be monitored to maintain a desired internal temperature. The monitored temperature can be communicated with the local computing device 110, the data center 150, the client computing device 170, the provider device 190, and/or other remote systems. Also, a temperature sensor of the locker 180 can sense the temperature of a product/goods placed within the locker 180, which can be used to control the internal temperature to maintain the product/goods at a desired range of temperature.

In some aspects, the locker 180 can represent one or more lockers to provide each of the lockers with an independent locking system. In other words, the locker 180 can have multiple locker spaces to serve one or more users. For example, different users (e.g., user A, user B, user C) can be dedicated to respective locker spaces (e.g., locker A, locker B, locker C, respectively) so that only a user who is assigned to the specific locker can have access to that locker. Further discussion of the locker 180 is provided below with respect to FIG. 4.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102, the client computing device 170, and the provider device 190. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

The provider device 190 can be associated with a provider that provides product/goods or services such as a grocery store, a retail store, a restaurant, a coffee shop, a bakery, a dry cleaner, a department store, etc. The provider device 190 can be any applicable computing device that facilitates communication between a provider, the AV 102, and the data center 150. Non-limiting examples of the provider device 190 can include a server, desktop computer, laptop computer, tablet computer, smartphone, smart wearable device, gaming system, or any other computing device for facilitating remote communication with the AV 102 and the data center 150. The provider device 190 can receive and/or send signals from/to the various stacks and components of the AV 102, the data center 150, the client computing device 170, and other remote systems. For example, the provider device 190 can send, to the remote systems, information relating to the provider such as provider/store information (e.g., address, open hours, available products/goods/services, service options, phone number, parking options, etc.), a wait time, a preparation time, a preparation progress, etc.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
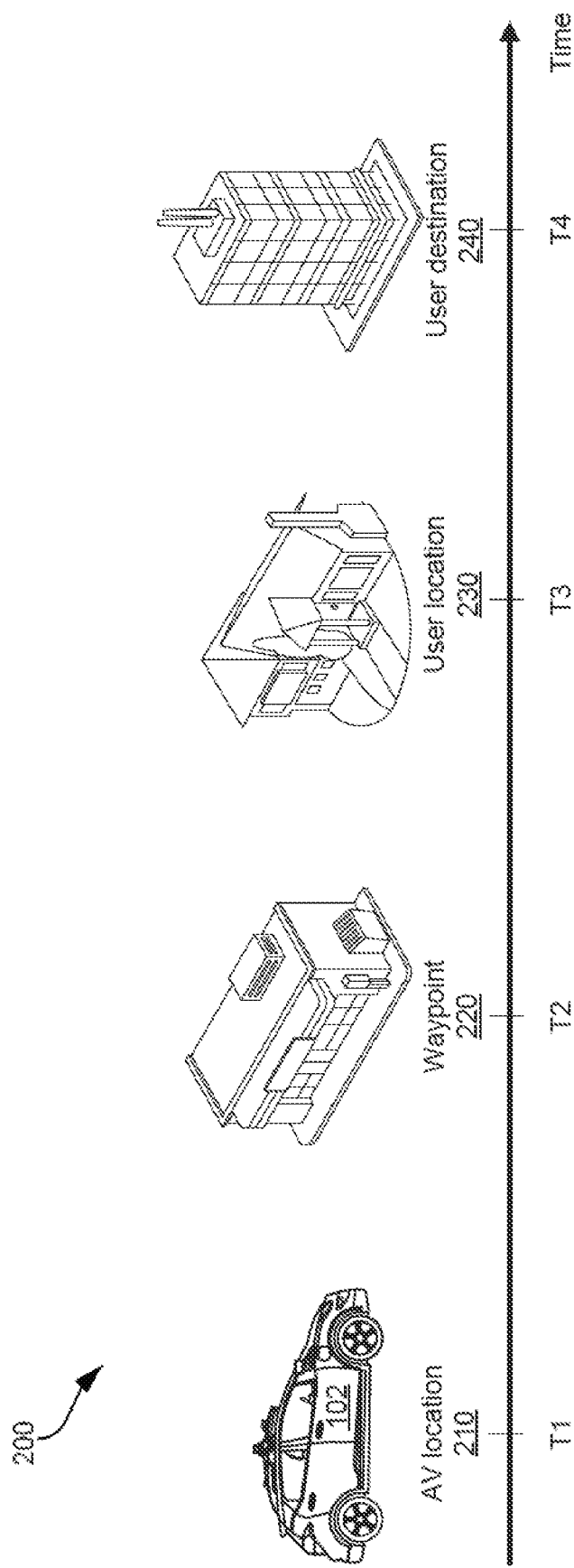
FIG. 2 is a diagram illustrating an example route of an AV for picking up a product prior to picking up a user, in accordance with some examples of the present disclosure.

FIG. 2 is a diagram illustrating an example route of an AV for picking up a product prior to picking up a user. In this example, the example route 200 shows a path of the AV 102 that travels from an AV location 210 at time $T_1$ to a waypoint 220 at time $T_2$, to a user location 230 at time $T_3$, and to a user destination 240 at time $T_4$. The AV location 210 can indicate a starting point of the route where the AV 102 is initially located. The waypoint 220 (e.g., a point of service) can be associated with a place that provides (e.g., sells or rents) products/goods such as a grocery store, a retail store, a restaurant, a coffee shop, a bakery, a dry cleaner, a department store, etc. The user location 230 indicates a pick-up location where the AV 102 picks up the user. The user destination 240 indicates a drop-off location where the AV 102 drops off the user.

Figure 4:
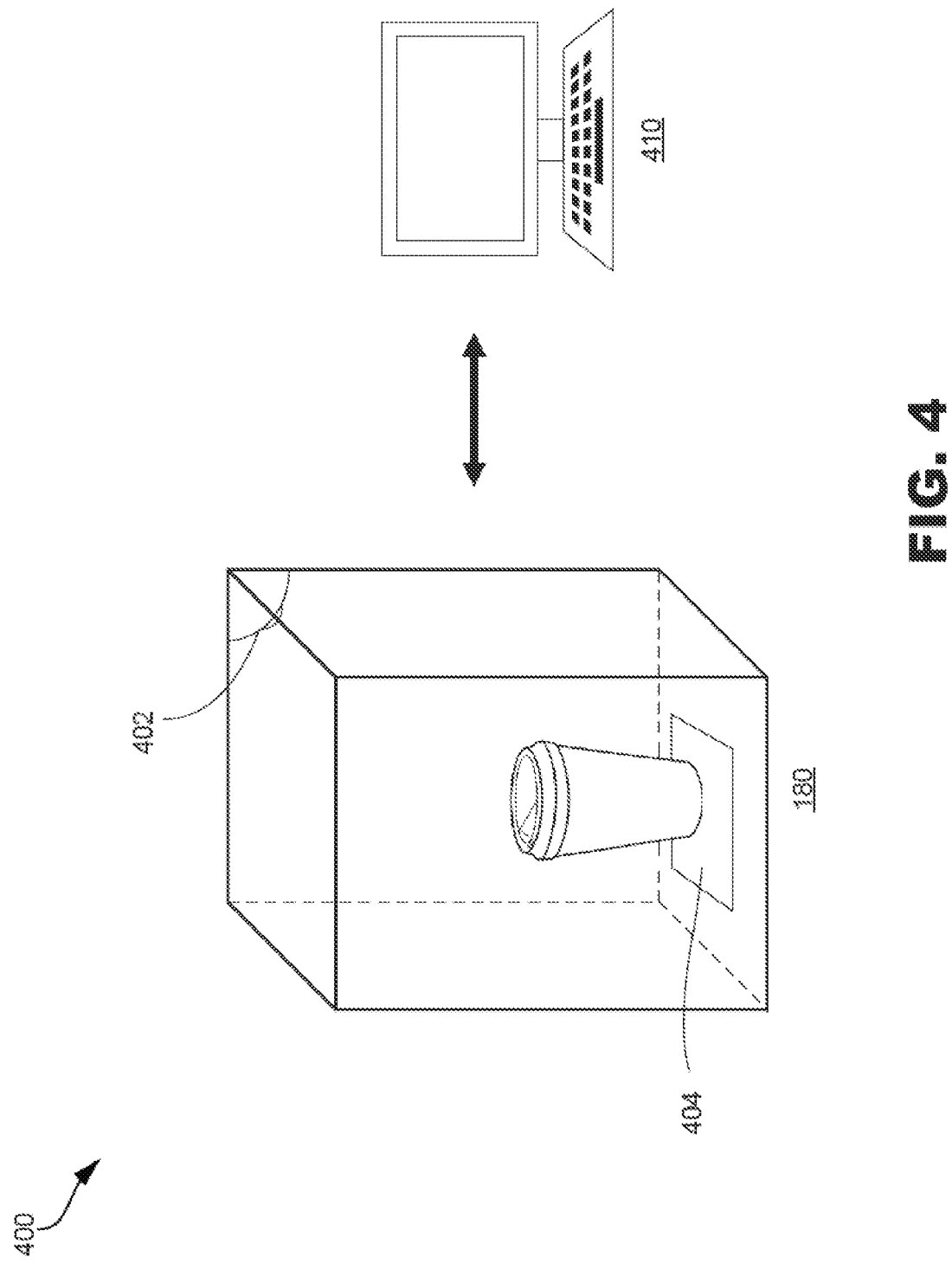
FIG. 4 is a diagram illustrating an example locker system of an AV, in accordance with some examples of the present disclosure.

In some examples, the systems and techniques described herein can receive a user request from a user device (e.g., client computing device 170 or a computing device similar to the client computing device 170) that schedules a ride in the AV 102. The user request can include a request for a product/goods pick-up at the waypoint 220, a request for a user pick-up at the user location 230, and a request for a user drop-off at the user destination 240. For example, a user would like to obtain a cup of coffee on the way to work in the morning, but does not have enough time to stop by a coffee shop. Instead, the user can schedule a trip for the AV 102 to stop by the waypoint 220 (e.g., a coffee shop) and pick up the cup of coffee for the user on the way to the user location 230. As follows, when the AV 102 picks up the user at the user location 230, the cup of coffee can be ready in the AV 102 (e.g., in the locker 180 of the AV 102 as illustrated in FIGS. 1 and 4).

In some examples, there can be a time delay between $T_2$ (e.g., at the waypoint 220) and $T_3$ (e.g., at the user location 230). In other words, the AV 102 can make trips to other locations or stay idle between the waypoint 220 at $T_2$ and the user location 230 at $T_3$. For example, a user schedules a ride from a workplace to a house at a certain designated time, for example, 11 pm and requests a grocery pick-up at a grocery store that closes at 9 pm. The AV 102 can travel to the grocery store and pick up the requested grocery before the store closes at 9 pm. Also, the AV 102 can keep the picked-up item(s) in the AV 102 (e.g., in the locker 180 of the AV 102 as illustrated in FIGS. 1 and 4) until the AV travels to the workplace at 11 pm. The AV 102 can provide a ride to other users between 9 pm ($T_2$) and 11 pm ($T_3$) while storing the picked-up item(s) in the AV 102.

While the example route 200 shows a single waypoint 220, any applicable number of waypoints for picking up product(s)/goods can be added without departing from the scope of the disclosed technology. For example, a user request can include multiple product(s)/goods pick-ups at one or more waypoints (e.g., a grocery pick-up at a grocery store, food pick-up at a restaurant, and a laundry pick-up at a dry cleaner, etc.) prior to picking up a user at the user location 230.

In some aspects, the systems and techniques described herein can plan a route for the AV 102 to travel, from the AV location 210, to the waypoint 220, to the user location 230, and to the user destination 240 based on the user request. For example, the planning stack 118 of the AV 102 as illustrated in FIG. 1 can plan the example route 200 based on various factors such as a travel time, a travel distance, a travel cost, a product/goods preparation time, a user preference, etc. Furthermore, sensor data captured by the sensor systems 104-108 as illustrated in FIG. 1 can be used to optimize the example route 200 (e.g., to determine the shortest distance based on the current traffic observed by the sensor systems 104-108 of the AV 102).

In some examples, the example route 200 can be planned based on information received from the provider device 190. For example, the systems and techniques described herein can receive signals from the provider device 190 relating to the waypoint 220 such as store information (e.g., address, open hours, available products/goods/services, service options, phone number, parking options, etc.), a wait time, a preparation time, a preparation progress, etc. As follows, based on the information received from the provider device 190, the example route 200 can be planned to optimize the timing of picking up the requested product/goods, picking up the user, and dropping off the user.

In some aspects, the example route 200 can be planned based on sensor data collected by a plurality of AVs in an AV fleet. For example, the AV 102 can be part of an AV fleet that comprises a plurality of AVs that are navigating on road. The systems and techniques described herein (e.g., the data center 150 as illustrated in FIG. 1) can receive sensor data captured by AVs of an AV fleet that is descriptive of the surrounding environment near the AV location 210, the waypoint 220, the user location 230, the user destination 240, or any path along these points. For example, the sensor data captured by AVs of an AV fleet can include image data that is descriptive of a potential wait line, crowd, or parking condition at/near the waypoint 220. Also, a planning stack 118 can plan the example route 200 covering a geographic area that includes the AV location 210, the waypoint 220, the user location 230, and/or the user destination 240 and that is spanned by AVs of an AV fleet based on the traffic information provided by the sensor data from the AVs of the AV fleet. As follows, the example route 200 can be planned in real time to optimize the timing of the product/goods pick-up, the user pick-up, and/or the user drop-off.

In some examples, the systems and techniques described herein can identify one or more locations for the waypoint 220 and select the one location in the example route 200 based on a travel time, a travel distance, a travel cost, a product preparation time (e.g., a cooking time), a user preference, store information, etc. For example, a user request can include a request for picking up a cup of coffee without selecting a specific location of a coffee shop. The systems and techniques described herein can identify one or more coffee shops near the AV location 210 and/or the user location 230 to determine which one to be selected as the waypoint 220 based on a travel time (e.g., that provides the shortest wait time or travel time), a travel distance (e.g., that provides the shortest driving distance in miles), a travel cost, a coffee preparation time, a user preference, etc.

As previously noted, the systems and techniques described herein can facilitate communication with the provider device 190 remotely over a network. In some cases, upon receipt of a user request, the systems and techniques described herein can send signals to the provider device 190 to notify a user's request for a product/goods that needs to be picked up by the AV 102. Further, as the AV 102 drives towards the waypoint 220, the travel progress of the AV 102 can be transmitted to the provider device 190 so that the timing for the product/goods pick-up can be optimized based on the arrival time of the AV 102. In some cases, the systems and techniques described herein can receive, from the provider device 190, product/goods preparation information such as the progress of the preparation and then transmit the received information to the client computing device 170 (e.g., to be displayed on user interface of the client computing device 170).

In some cases, upon receipt of the requested product/goods or arrival at the waypoint 220, the systems and techniques described herein can verify the product/goods for pick-up at the waypoint 220 using one or more sensor systems 104-108 of the AV 102. For example, cameras (e.g., still image cameras, video cameras, etc.) mounted on the AV 102 can take image/video of the product/goods that is ready for pick-up to verify if the product/goods has/have been correctly prepared. In some cases, the image data can be transmitted to the client computing device 170 so that a user can confirm the verification of the requested product/goods. In some cases, an external microphone placed on the AV 102 can enable communication between an agent at the waypoint 220 and a user to ensure the verification of the product/goods.

While the example route 200 shows a pick-up and drop-off service for a single user, any applicable number of users or product/goods pick-up for other users can be included without departing from the scope of the disclosed technology. In some examples, the example route 200 can include a pick-up location for a second user (not shown). For example, the AV 102 can be scheduled to pick up a second user after the AV 102 finishes dropping off the user at the user destination 240. The second user can have a request for product/goods pick-up at a second waypoint (not shown), for example as a part of the second user's scheduled trip. In some examples, the systems and techniques described herein can determine whether the second waypoint is located at any point between the AV location 210 and the user destination 240. Further, the systems and techniques described can determine whether to make a stop at the second waypoint between the AV location 210 and the user destination 240 based on one or more constraints (e.g., distance, travel time, etc.). If added distance and/or time to make a stop at the second waypoint is below or within a threshold (e.g., such that maintaining or controlling the temperature of product/goods requested by the user and/or the second user is not affected), the AV 102 can travel to the second waypoint to pick up the product/goods as requested by the second user in between the AV location 2210 and the user destination 240. Also, if the AV 102 has sufficient temperature control capabilities to maintain the temperature of the product/goods requested by the user and/or the second user, the AV 102 can make a stop at the second waypoint between the AV location 210 and the user destination 240.

In some cases, the systems and techniques described herein can transmit a signal to the user device (e.g., the client computing device 170) to request for approval on making a detour or stop at the second waypoint. In some examples, an incentive (e.g., a discount, an upgrade of a type of a ride, a membership upgrade, credits, points, etc.) can be offered to the user device (e.g., the client computing device 170) before the user agrees to the detour (e.g., making a stop at a second waypoint to pick up the product/goods requested by the second user while the AV 102 is making a trip between the AV location 210 and the user destination 240). In some examples, the product/goods that are requested by the second user is not time-sensitive or temperature-sensitive, the systems and techniques described herein can schedule a pick-up of the product/goods while the AV 102 is idle or travels in the proximity of the second waypoint for picking up the product/goods requested by the second user at any time of the day.

In some cases, the systems and techniques described herein can communicate with a plurality of AVs in an AV fleet, as previously described. More specifically, the AV 102 and the plurality of AVs in the AV fleet can share the scheduled trip (e.g., from the AV location 210 to the user destination 240) and/or the requested pickup of products/goods (e.g., at the waypoint 220). In some cases, the AV 102 can pick up a product/goods that are scheduled or requested with one of the plurality of AVs in the AV fleet if the AV 102 is in the proximity of a pickup and/or drop-off location and deliver the product/goods to another AV, for example at an AV depot where the product/goods can be loaded to the other AV.

Figure 3:
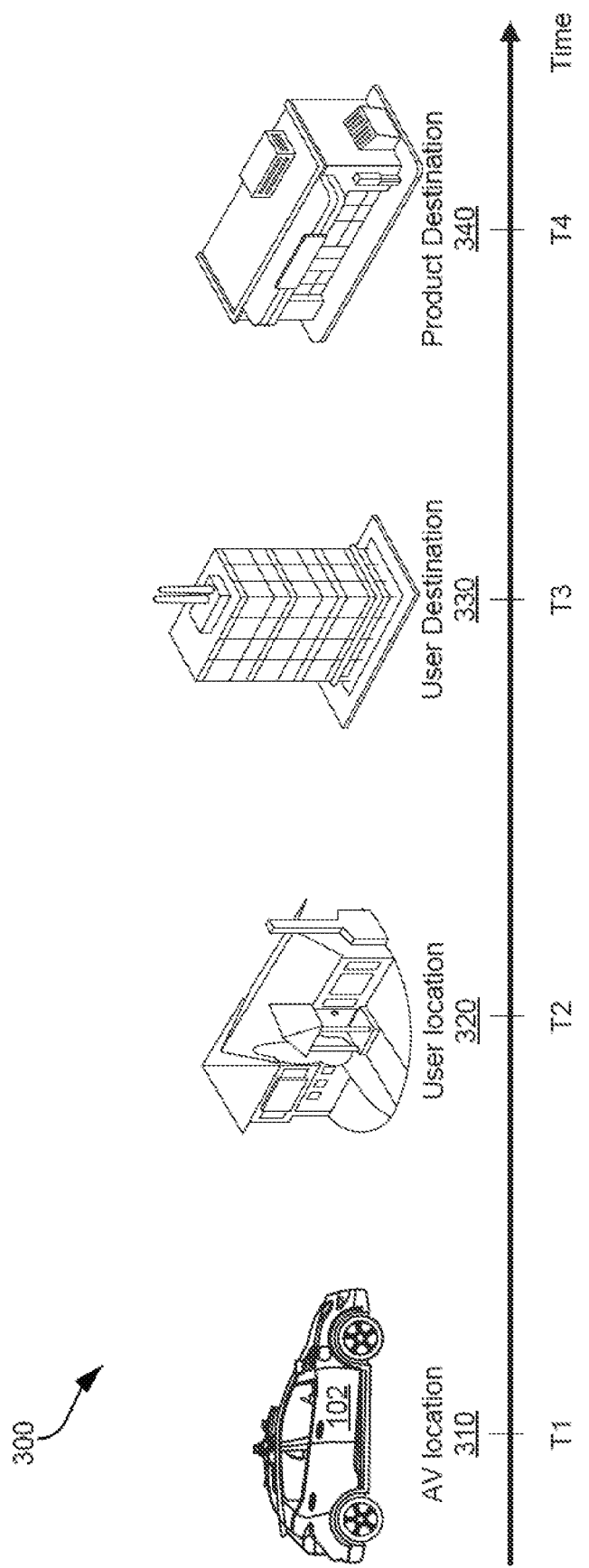
FIG. 3 is a diagram illustrating an example route of an AV for dropping off a product after dropping off a user, in accordance with some examples of the present disclosure.

FIG. 3 is a diagram illustrating an example route of an AV for dropping off a product after dropping off a user. In this example, the example route 300 shows a path of the AV 102 that travels from an AV location 310 at time $T_1$ to a user location 320 at time $T_2$, to a user destination 330 at time $T_3$, and to a product destination 340 at time $T_4$. The AV location 310 can indicate a starting point of the route where the AV 102 is initially located. The user location 230 indicates a pick-up location where the AV 102 picks up the user. The user destination 330 indicates a drop-off location where the AV 102 drops off the user. The product destination 340 (e.g., a point of service) can be associated with a place that provides products/goods/services such as a dry cleaner, a post office, a department store, etc.

In some examples, the systems and techniques described herein can receive a user request from a user device (similar to the client computing device 170) that schedules a ride in the AV 102. The user request can comprise a request for a user pick-up at the user location 320, and a request for a user drop-off at the user destination 330, and a request for a product drop-off at the product destination 340. For example, a user may need to drop off a package at a post office on the way to work in the morning, but does not have enough time, possibly due to traffic or having to take a detour, to go to the post office. Instead, the user can schedule a trip for the AV 102 to travel to the product destination 340 (e.g., the post office) and drop off the package after dropping off the user at the user destination 330.

In some examples, there can be a time delay between $T_3$ (e.g., at the user destination 330) and $T_4$ (e.g., at the product destination 340). In other words, the AV 102 can make trips to other locations or stay idle between the user destination 330 at $T_3$ and the product destination 340 at $T_4$. For example, a user schedules a ride from a house to a workplace at a certain designated time, for example, 7 am and requests a package drop-off at a post office that opens at 9 am. The AV 102 picks up the user at 7 am and drops off the user at the user destination 330. Further, the AV can keep the item that needs to be dropped off in the AV 102 (e.g., in the locker 180 of the AV 102 as illustrated in FIGS. 1 and 4) until the AV travels to the post office by 9 am. The AV 102 can provide a ride to other users after dropping off the user until the AV 102 travels to the post office while storing the item to be dropped off in the AV 102.

While the example route 200 shows a single product destination 340, any applicable number of product destinations for dropping off products can be added without departing from the scope of the disclosed technology. For example, a user request can include multiple product drop-offs at one or more product destinations (e.g., a package drop-off at a post office, a dirty laundry drop-off at a dry cleaner, a book drop-off at a library, etc.) post dropping off the user at the user destination 330.

In some aspects, the systems and techniques described herein can plan a route for the AV 102 to travel, from the AV location 310, to the user location 320, to the user destination 330, and to the product destination 340 in a similar manner as described above with respect to the example route 200 of FIG. 2. For example, the example route 300 can be planned based on various factors (e.g., a travel time, a travel distance, a travel cost, a product/goods preparation time, a user preference, etc.), information received from the provider device 190 associated with the product destination 340, sensor data collected by a plurality of AVs in an AV fleet that are at/near the AV location 310, the user location 320, the user destination 330, and/or the product destination 340, and so forth.

FIG. 4 is a diagram illustrating an example locker system of an AV. The example locker system 400 can comprise a locker 180 of the AV 102 and a locker computing device 410, which is configured to manage/control a locking mechanism of the locker 180.

In some examples, the locker 180 can comprise one or more sensor systems 104-108 (e.g., a camera 402, a weight sensor 404 as shown in FIG. 4) at any proper location of the locker 180. For example, the camera 402 can take an image of an item placed in the locker 180. Such image can be used to monitor the state/status of the item and/or verify the item to determine if the item placed in the locker 180 is what is requested in a user request for a pick-up. Further, the image data can be transmitted to the client computing device 170 for verification of the product. In another example, the weight sensor 404 can measure the weight of an item placed in the locker 180 for verification of the item. In yet another example, a temperature sensor (not shown) can measure and monitor the internal temperature of the locker 180 and/or the temperature of an item placed in the locker 180. The measured temperature can be communicated to the locker computing device 410, the local computing device 110, the data center 150, the client computing device 170, the provider device 190, and/or other remote systems.

In some aspects, the locker 180 is temperature controlled to store an item in the locker 180 at a desired range of temperature. As previously noted, the locker 180 can comprise any applicable cooling or heating means (e.g., a fan, ice, dry ice, heat pack, heater, frozen or cold substance such as frozen glycerin, a water cooling and/or heating system, etc.). For example, if the AV 102 picks up a cup of coffee at the waypoint 220, the temperature-controlled locker 180 can keep the cup of coffee warm until it is delivered to the user at the user location 230 or the user destination 240. In some examples, a temperature (e.g., the internal temperature of the locker 180 or the temperature of an item placed in the locker 180) measured by a temperature sensor can be used to control the internal temperature of the locker 180 by a remote system (e.g., lowering or increasing the temperature of a heater, increasing or decreasing a fan speed, etc.).

In some aspects, the locker 180 can have one or more compartments or units that are temperature controlled. To illustrate, the temperature of each of the one or more compartments or units can be independently controllable to provide various temperatures, for example, hot temperature, warm temperature, ambient temperature, chilled temperature, and/or frozen temperature. Each of the plurality of compartments can have varying sizes, shapes, and temperature units to be suited for particular product/goods.

As noted, the operation of the locking system/mechanism of the locker 180 can be controlled and/or programmed locally and/or remotely to grant closing and opening authorizations to a designated user with access. For example, a computer associated with the AV 102 (e.g., the local computing device 110 as illustrated in FIG. 1, or the locker computing device 410 as illustrated in FIG. 4) can activate the automatic opening of the locker 180. In other words, a computer associated with the AV 102 can send an instruction to open the locker 180.

In some cases, the instruction to open the locker 180 can be generated automatically when the AV 102 pick up the user at the user location 230 or the AV 102 has arrived at the user destination 240. For example, upon arrival at the user location 230 or upon confirmation of the presence of the user in the AV 102, the locker 180 can be automatically opened so that the user can have access to the requested product/goods. In other example, upon arrival at the user destination 240, the locker 180 can be automatically opened so that the user can take the requested product/goods out and leave the AV 102.

In some examples, the instruction to open the locker 180 can be based on sensor data captured by one or more sensors of the AV 102 (e.g., the sensor systems 104-108 of the AV 102). In other words, the locker 180 can be automatically opened based on verification that the user is in the AV 102, which can be determined based on sensor data captured by the sensor systems 104-108 of the AV 102. In some cases, the sensor data can include biometric data that is associated with a user such as facial recognition data, fingerprint recognition data, voice recognition data, iris scan data, and retinal recognition data. For example, a camera mounted on the AV 102 can provide image data that can be used for facial recognition of the user. In other example, an audio sensor of the AV 102 can provide audio data that can be used for voice recognition of the user.

In some aspects, the instruction to open the locker 180 can be based on a user input. For example, a user can provide an indication that a trip has ended (e.g., clicking "a trip has ended" on the user interface) via the client computing device 170. In other example, a user can send a request to open the lock (e.g., on the user interface) via the client computing device 170.

In some cases, the AV 102 can use the sensor systems 104-108 of the AV 102 to perform facial recognition and/or iris recognition to automatically authenticate the user and open the locker 180 for the user. For example, the AV 102 can use a camera sensor on the AV 102 to capture one or more images depicting a face of the user and/or the user's eyes, and can use the one or more images to perform facial recognition or iris recognition to authenticate the user and open the locker 180 for the user. In some examples, the AV 102 can additionally use stored facial recognition data and/or iris recognition data to authenticate the user. The facial recognition data and/or iris recognition data can be stored in a user profile. For example, facial recognition data and/or iris recognition data can be stored in a user profile maintained and/or stored in the ridesharing application 172. To authenticate the user via facial recognition or iris recognition, the local computing device 110 of the AV 102 can compare facial recognition data or iris recognition data stored in the user profile with facial recognition data or iris recognition data obtained by the local computing device 110 based on an analysis (e.g., via a facial and/or iris recognition algorithm, a neural network configured to perform facial and/or iris recognition, etc.) of the one or more images obtained by the local computing device 110 from one or more camera sensors on the AV 102. The one or more images can depict the face of the user and/or the user's eyes, as previously explained.

In some cases, the local computing device 110 of the AV 102 can use gesture recognition to recognize input gestures from the user to use to control one or more aspects of the locker 180. For example, after authenticating the user as previously described (e.g., via facial recognition, iris recognition, other biometric recognition, a digital key or hash configured to serve as an authentication key, and/or any other authentication technique described herein), the local computing device 110 can monitor image data captured by the camera sensor on the AV 102 to detect any gestures from the user. If the local computing device 110 detects a gesture from the user, the local computing device 110 can translate the gesture into a command or instruction for controlling one or more aspects of the locker 180 such as, for example, opening the locker 180, changing a temperature control setting of the locker 180, activate one or more lights within the locker 180 (e.g., to increase the user's visibility inside of the locker 180, to sanitize or disinfect one or more objects in the locker 180 (and/or the air in the locker 180 and/or one or more substances in the locker 180) using UV or UVC light, etc.), deactivate one or more lights within the locker 180 (e.g., to avoid harming one or more substances in the locker 180 that may need to be maintained in a cool place and away from direct light and/or that can otherwise be harmed or decomposed by light, etc.).

For example, if the user makes an opening gesture, the local computing device 110 can detect and recognize such gesture by analyzing (e.g., using an algorithm or neural network model configured to detect and recognize gestures) one or more images from a camera sensor of the AV 102 that depict the gesture by the user. The local computing device 110 can translate the gesture to a command or instruction to open the locker 180 (e.g., based on a mapping of gestures to commands/instructions/translations). As another example, if the user makes a gesture signaling up (e.g., pointing up with a finger/hand or making a lifting or raising gesture with a hand/finger) or signaling down (e.g., pointing down with a hand/finger or making a lowering gesture with a hand/finger), the local computing device 110 can detect and recognize such gesture by analyzing (e.g., using an algorithm or neural network model configured to detect and recognize gestures) one or more images from the camera sensor of the AV 102 that depict the gesture by the user. The local computing device 110 can translate the gesture of the user signaling up to a command or instruction to raise a temperature of the locker 180 (e.g., based on a mapping of gestures to commands/instructions/translations) or can translate the gesture of the user signaling down to a command or instruction to lower a temperature of the locker 180 (e.g., based on a mapping of gestures to commands/instructions/translations).

Figure 5:
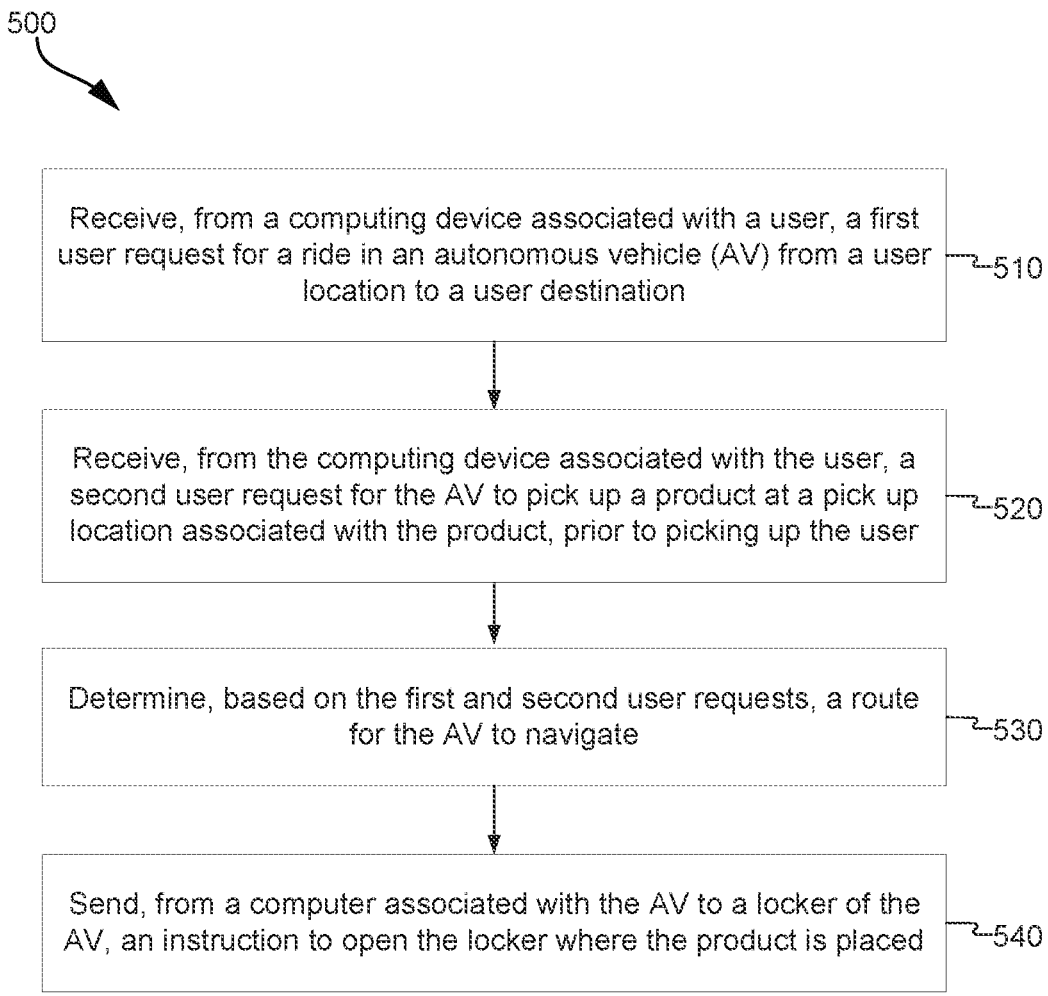
FIG. 5 is a flowchart illustrating an example process for providing a preorder delivery in an autonomous vehicle, in accordance with some examples of the present disclosure.

FIG. 5 is a flowchart illustrating an example process 500 for providing a preorder delivery in an autonomous vehicle (e.g., AV 102 as illustrated in FIG. 1). Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

At block 510, the process 500 can include receiving, from a computing device associated with a user, a first user request for a ride in an AV from a user location to a user destination. For example, the systems and techniques described herein can receive, from the client computing device 170, a user request for a ride in the AV 102 from the user location 230 to the user destination 240.

At block 520, the process 500 can include receiving, from the computing device associated with the user, a second user request for the AV to pick up a product at a pick-up location associated with the product, prior to picking up the user. For example, the user request received at block 510 can further include a request for a product pick-up at the waypoint 220 prior to picking up the user at the user location 230. In other words, the AV 102 can travel to the waypoint 220 from the AV location 210, without picking up the user yet, to pick the requested product and transport the product to the user location 230. This way, the product can be delivered to the user by the AV 102 without the user being physically visiting the waypoint 220 to pick up the product.

At block 530, the process 500 can include determining, based on the first and second user requests, a route for the AV to navigate. The route can include a first segment from a location of the AV to the pick-up location associated with the product, a second segment from the pick-up location associated with the product to the user location, and a third segment from the user location to the user destination. For example, based on the request received at blocks 510 and 520, the systems and techniques described herein can plan a route for the AV 102 to navigate from the AV location 210 to the waypoint 220 to pick up the requested product, to the user location 230 to pick up the user, and to the user destination 240 to drop off the user.

In some aspects, the route (e.g., the example routes 200 and/or 300 as illustrated in FIGS. 2 and 3) for the AV 102 to navigate can be determined based on calculating at least one of a travel time, a travel distance, a travel cost, a product preparation time, and a user preference.

In some examples, the route (e.g., the example routes 200 and/or 300 as illustrated in FIGS. 2 and 3) for the AV 102 to navigate can be determined based on sensor data collected by a plurality of AVs navigating along at least one segment of the route. For example, a plurality of AVs in an AV fleet that is navigating at/near the AV location 210, the waypoint 220, the user location 230, and/or the user destination 240 can provide sensor data that can indicate the current traffic information, which can be useful in optimizing the route of the AV 102.

At block 540, the process 500 can include sending, from a computer associated with the AV to a locker of the AV, an instruction to open the locker where the product is placed. The instruction can be generated automatically in response to a determination that the user has been picked up at the user location or the AV has arrived at the user destination. For example, an instruction (or a signal) can be automatically generated to open the locker 180 of the AV 102 when the AV 102 pick up the user at the user location 230 or the AV 102 drops off the user at the user destination 240 so that the user can access the requested product that has been picked up and placed in the locker 180. In some examples, the locker 180 is temperature controlled to keep an item in the locker 180 at the desired temperature. Also, the temperature controller locker 180 can keep the requested product secured at the desired temperature until it is delivered to the user.

In some aspects, the instruction to open the locker can be based on sensor data captured by one or more sensors of the AV (e.g., the sensor systems 104-108 of the AV 102) and associated with the user such as biometric data (e.g., an image data associated with the user, an audio data associated with the user, etc.). Non-limiting examples of the biometric data include at least one of facial recognition data, fingerprint recognition data, voice recognition data, iris scan data, and retinal recognition data. In some aspects, the instruction to open the locker is further based on a user input indicating that a trip has ended and a request to open the locker. For example, a user input can be provided via the user interface associated with the client computing device 170.

Figure 6:
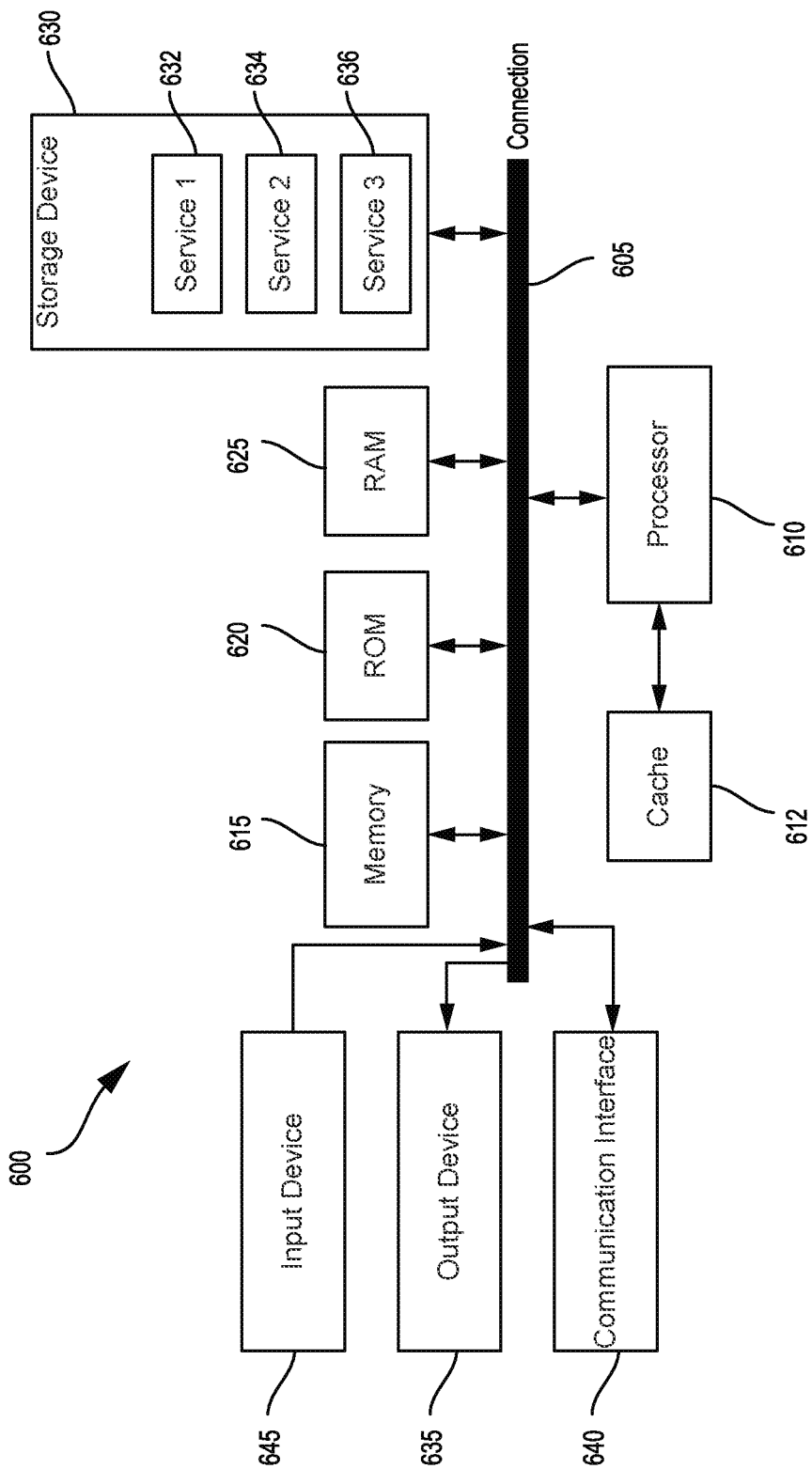
FIG. 6 is a diagram illustrating an example system architecture for implementing certain aspects described herein.

FIG. 6 illustrates an example processor-based system with which some aspects of the subject technology can be implemented. For example, processor-based system 600 can be any computing device making up, the local computing device 110, the client computing device 170 executing the ridesharing application 172, the provider device 190, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some cases, one or more of the described system components represents many such components each performing some or all of the function for which the component is described. In some cases, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 can include an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, causes the system to perform a function. In some examples, a hardware service that performs a particular function can include the software component stored in a computer-readable medium in connection with the necessary hardware components, such as processor 610, connection 605, output device 635, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: receive, from a computing device associated with a user, a first user request for a ride in an autonomous vehicle (AV) from a user location to a user destination; receive, from the computing device associated with the user, a second user request for the AV to pick up a product at a pick-up location associated with the product, prior to picking up the user; determine, based on the first and second user requests, a route for the AV to navigate, the route comprising a first segment from a location of the AV to the pick-up location associated with the product, a second segment from the pick-up location associated with the product to the user location, and a third segment from the user location to the user destination; and send, from a computer associated with the AV to a locker of the AV, an instruction to open the locker where the product is placed, the instruction being generated automatically in response to a determination that the user has been picked up at the user location or the AV has arrived at the user destination.

Aspect 2. The system of Aspect 1, wherein the one or more processors are configured to: receive, from the computing device associated with the user, a third user request for the AV to drop off a second product at a product destination after dropping off the user at the user destination.

Aspect 3. The system of any of Aspects 1 or 2, wherein the instruction to open the locker is based on sensor data captured by one or more sensors of the AV, the sensor data being associated with the user.

Aspect 4. The system of Aspect 3, wherein the sensor data includes biometric data associated with the user, the biometric data comprising at least one of facial recognition data, fingerprint recognition data, voice recognition data, iris scan data, and retinal recognition data.

Aspect 5. The system of any of Aspects 1 to 4, wherein the instruction to open the locker is based on a user input, the user input comprising at least one of an indication that a trip has ended and a request to open the locker.

Aspect 6. The system of any of Aspects 1 to 5, wherein the locker is temperature controlled.

Aspect 7. The system of any of Aspects 1 to 6, wherein the locker is one or more lockers.

Aspect 8. The system of any of Aspects 1 to 7, wherein the one or more processors are configured to: facilitate verification of the product using one or more sensors of the AV upon receipt of the product at the pick-up location.

Aspect 9. The system of any of Aspects 1 to 8, wherein determining the route for the AV to navigate is based on calculating at least one of a travel time, a travel distance, a travel cost, a product preparation time, and a user preference.

Aspect 10. The system of any of Aspects 1 to 9, wherein determining the route for the AV to navigate is based on sensor data collected by a plurality of AVs navigating along at least one segment of the route.

Aspect 11. The system of any of Aspects 1 to 10, wherein the one or more processors are configured to: identify one or more locations of the pick-up location associated with the product; and select one of the one or more locations of the pick-up location based on at least one of a travel time, a travel distance, a travel cost, a product preparation time, and a user preference.

Aspect 12. The system of any of Aspects 1 to 11, wherein the one or more processors are configured to: transmit, to a pick-up location system, information associated with the second user request to notify the pick-up location to prepare the product for a pick-up.

Aspect 13. The system of Aspect 12, wherein the one or more processors are configured to: receive, from the pick-up location system, progress information associated with the product; and transmit, to the computing device associated with the user, the progress information associated with the product.

Aspect 14. A method comprising: receiving, from a computing device associated with a user, a first user request for a ride in an autonomous vehicle (AV) from a user location to a user destination; receiving, from the computing device associated with the user, a second user request for the AV to pick up a product at a pick-up location associated with the product, prior to picking up the user; determining, based on the first and second user requests, a route for the AV to navigate, the route comprising a first segment from a location of the AV to the pick-up location associated with the product, a second segment from the pick-up location associated with the product to the user location, and a third segment from the user location to the user destination; and sending, from a computer associated with the AV to a locker of the AV, an instruction to open the locker where the product is placed, the instruction being generated automatically in response to a determination that the user has been picked up at the user location or the AV has arrived at the user destination.

Aspect 15. The method of Aspect 14, further comprising: receiving, from the computing device associated with the user, a third user request for the AV to drop off a second product at a product destination after dropping off the user at the user destination.

Aspect 16. The method of any of Aspects 14 or 15, wherein the instruction to open the locker is based on sensor data captured by one or more sensors of the AV, the sensor data being associated with the user.

Aspect 17. The method of Aspect 16, wherein the sensor data includes biometric data associated with the user, the biometric data comprising at least one of facial recognition data, fingerprint recognition data, voice recognition data, iris scan data, and retinal recognition data.

Aspect 18. The method of any of Aspects 14 to 17, wherein the instruction to open the locker is based on a user input, the user input comprising at least one of an indication that a trip has ended and a request to open the locker.

Aspect 19. The method of any of Aspects 14 to 18, wherein the locker is temperature controlled.

Aspect 20. A non-transitory computer-readable medium having stored thereon instructions which, when executed by one or more processors, cause the one or more processors to: perform a method according to any of Aspects 14 to 19.

Aspect 21. A system comprising means for performing a method according to any of Aspects 14 to 19.

Aspect 22. A computer-program product comprising instructions which, when executed by one or more processors, cause the one or more processors to perform a method according to any of Aspects 14 to 19.

Aspect 23. An autonomous vehicle comprising a computing device configured to perform a method according to any of Aspects 14 to 19.

What is claimed is:

1. A system comprising:
a memory; and
one or more processors coupled to the memory, the one or more processors being configured to:
receive, from a computing device associated with a user, a first user request for a ride in an autonomous vehicle (AV) from a user location to a user destination;
receive, from the computing device associated with the user, a second user request for the AV to pick up a product at a pick-up location associated with the product, prior to picking up the user;
determine, based on the first and second user requests, including a desired temperature of the product when the user receives the product via the AV, a route for the AV to navigate, the route comprising a first segment from a location of the AV to the pick-up location associated with the product, a second segment from the pick-up location associated with the product to the user location, and a third segment from the user location to the user destination; and
send, from a computer associated with the AV to a locker of the AV, an instruction to open the locker where the product is placed, the instruction being generated automatically in response to a determination that the user has been picked up at the user location or the AV has arrived at the user destination.

2. The system of claim 1, wherein the one or more processors are configured to:
receive, from the computing device associated with the user, a third user request for the AV to drop off a second product at a product destination after dropping off the user at the user destination.

3. The system of claim 1, wherein the instruction to open the locker is based on sensor data captured by one or more sensors of the AV, the sensor data being associated with the user.

4. The system of claim 3, wherein the sensor data includes biometric data associated with the user, the biometric data comprising at least one of facial recognition data, fingerprint recognition data, voice recognition data, iris scan data, and retinal recognition data.

5. The system of claim 1, wherein the instruction to open the locker is based on a user input, the user input comprising at least one of an indication that a trip has ended and a request to open the locker.

6. The system of claim 1, wherein the locker is temperature controlled.

7. The system of claim 1, wherein the locker is one or more lockers.

8. The system of claim 1, wherein the one or more processors are configured to:
facilitate verification of the product using one or more sensors of the AV upon receipt of the product at the pick-up location.

9. The system of claim 1, wherein determining the route for the AV to navigate is based on calculating a product preparation time.

10. The system of claim 1, wherein determining the route for the AV to navigate is based on sensor data collected by a plurality of AVs navigating along at least one segment of the route, wherein the sensor data includes data that indicates customer lines at a set of businesses and determining the route includes selecting a business from the set of businesses based on the data that indicates customer lines at a set of businesses.

11. The system of claim 1, wherein the one or more processors are configured to:
identify one or more locations of the pick-up location associated with the product; and
select one of the one or more locations of the pick-up location based on a product preparation time, and the desired temperature of the product when the user receives the product via the AV.

12. The system of claim 1, wherein the one or more processors are configured to:
detect a received temperature of the product upon receipt in the AV; and
adjusting the route for the AV based on the received temperature of the product such that the desired temperature of the product is met when the AV arrives at the user location.

13. The system of claim 12,
wherein adjusting the route includes adding an additional stop to pick up and drop off another user after picking up the product.

14. A method comprising:
receiving, from a computing device associated with a user, a first user request for a ride in an autonomous vehicle (AV) from a user location to a user destination;
receiving, from the computing device associated with the user, a second user request for the AV to pick up a product at a pick-up location associated with the product, prior to picking up the user;
determining, based on the first and second user requests, including a desired temperature of the product when the user receives the product via the AV, a route for the AV to navigate, the route comprising a first segment from a location of the AV to the pick-up location associated with the product, a second segment from the pick-up location associated with the product to the user location, and a third segment from the user location to the user destination; and
sending, from a computer associated with the AV to a locker of the AV, an instruction to open the locker where the product is placed, the instruction being generated automatically in response to a determination that the user has been picked up at the user location or the AV has arrived at the user destination.

15. The method of claim 14, further comprising:
receiving, from the computing device associated with the user, a third user request for the AV to drop off a second product at a product destination after dropping off the user at the user destination.

16. The method of claim 14, wherein the instruction to open the locker is based on sensor data captured by one or more sensors of the AV, the sensor data being associated with the user.

17. The method of claim 16, wherein the sensor data includes biometric data associated with the user, the biometric data comprising at least one of facial recognition data, fingerprint recognition data, voice recognition data, iris scan data, and retinal recognition data.

18. The method of claim 14, wherein the instruction to open the locker is based on a user input, the user input comprising at least one of an indication that a trip has ended and a request to open the locker.

19. The method of claim 14, wherein the locker is temperature controlled.

20. A non-transitory computer-readable medium having stored thereon instructions which, when executed by one or more processors, cause the one or more processors to:
receive, from a computing device associated with a user, a first user request for a ride in an autonomous vehicle (AV) from a user location to a user destination;
receive, from the computing device associated with the user, a second user request for the AV to pick up a product at a pick-up location associated with the product, prior to picking up the user;
determine, based on the first and second user requests, including a desired temperature of the product when the user receives the product via the AV, a route for the AV to navigate, the route comprising a first segment from a location of the AV to the pick-up location associated with the product, a second segment from the pick-up location associated with the product to the user location, and a third segment from the user location to the user destination; and
send, from a computer associated with the AV to a locker of the AV, an instruction to open the locker where the product is placed, the instruction being generated automatically in response to a determination that the user has been picked up at the user location or the AV has arrived at the user destination.

* * * * *